(12) United States Patent
Tran et al.

(10) Patent No.: US 12,540,771 B2
(45) Date of Patent: Feb. 3, 2026

(54) METHOD FOR LIQUEFYING A STREAM RICH IN $CO_2$

(71) Applicant: L'Air Liquide, Societe Anonyme pour l'Etude et l'Exploitation des Procedes Georges Claude, Paris (FR)

(72) Inventors: Michael Tran, Champigny sur Marne (FR); Mathieu Leclerc, Champigny sur Marne (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 274 days.

(21) Appl. No.: 18/280,060

(22) PCT Filed: Mar. 2, 2022

(86) PCT No.: PCT/EP2022/055319
§ 371 (c)(1),
(2) Date: Sep. 1, 2023

(87) PCT Pub. No.: WO2022/184794
PCT Pub. Date: Sep. 9, 2022

(65) Prior Publication Data
US 2024/0068744 A1 Feb. 29, 2024

(30) Foreign Application Priority Data
Mar. 3, 2021 (FR) ...................................... 2102068

(51) Int. Cl.
*F25J 1/00* (2006.01)
*F25J 1/02* (2006.01)

(52) U.S. Cl.
CPC ........... *F25J 1/0027* (2013.01); *F25J 1/0045* (2013.01); *F25J 1/0095* (2013.01); *F25J 1/0202* (2013.01);
(Continued)

(58) Field of Classification Search
CPC .......... F25J 1/0027; F25J 3/0266; F25J 3/067; F25J 2245/02; F25J 2210/04; F25B 2700/0106
See application file for complete search history.

(56) References Cited

U.S. PATENT DOCUMENTS

| 2012/0111051 A1* | 5/2012 | Kulkarni | .............. B01D 53/226 62/619 |
| 2013/0074511 A1* | 3/2013 | Tanaeva | .................. F25J 1/0055 60/772 |

(Continued)

FOREIGN PATENT DOCUMENTS

| FR | 2 934 170 | 1/2010 |
| FR | 2 975 478 | 11/2012 |

(Continued)

OTHER PUBLICATIONS

International Search Report and Written Report for PCT/EP2022/055319, mailed Jun. 9, 2022.
(Continued)

*Primary Examiner* — Brian M King
(74) *Attorney, Agent, or Firm* — Justin K. Murray

(57) ABSTRACT

In a method for liquefying a gas rich in carbon dioxide, the gas is compressed to a first pressure greater than its critical pressure in a compressor to form a compressed gas, the compressed gas is cooled through heat exchange with a refrigerant to a variable temperature to form a cooled compressed gas with a density between 370 and 900 kg/m$^3$, the cooled compressed gas is cooled at supercritical pressure in a first heat exchanger to a temperature below the critical temperature, the gas cooled below the critical temperature is expanded to a second pressure between 45 and 60 bara to form a diphasic fluid which is separated in a phase separator to form a liquid and a gas, and a liquid portion originating from the phase separator provides cold to the first heat exchanger.

13 Claims, 2 Drawing Sheets

(52) U.S. Cl.
CPC ........ *F25J 2205/04* (2013.01); *F25J 2210/80* (2013.01); *F25J 2230/80* (2013.01); *F25J 2240/40* (2013.01); *F25J 2270/80* (2013.01)

(56) References Cited

U.S. PATENT DOCUMENTS

| | | | |
|---|---|---|---|
| 2014/0026611 A1* | 1/2014 | Darde | F25J 1/0027 62/606 |
| 2015/0253073 A1 | 9/2015 | Lee et al. | |
| 2016/0069262 A1* | 3/2016 | Allam | F25J 3/04618 60/39.5 |

FOREIGN PATENT DOCUMENTS

| | | |
|---|---|---|
| FR | 3 088 416 | 5/2020 |
| WO | WO 2012/140381 | 10/2012 |

OTHER PUBLICATIONS

French Search Report for FR 2 102 068, mailed Nov. 5, 2021.
Aspelund, et al., "Gas conditioning—The interface between CO2 capture and transport," Jun. 16, 2007, vol. 1, No. 3, Jun. 16, 2007, pp. 343-354.

* cited by examiner

[Fig. 1]
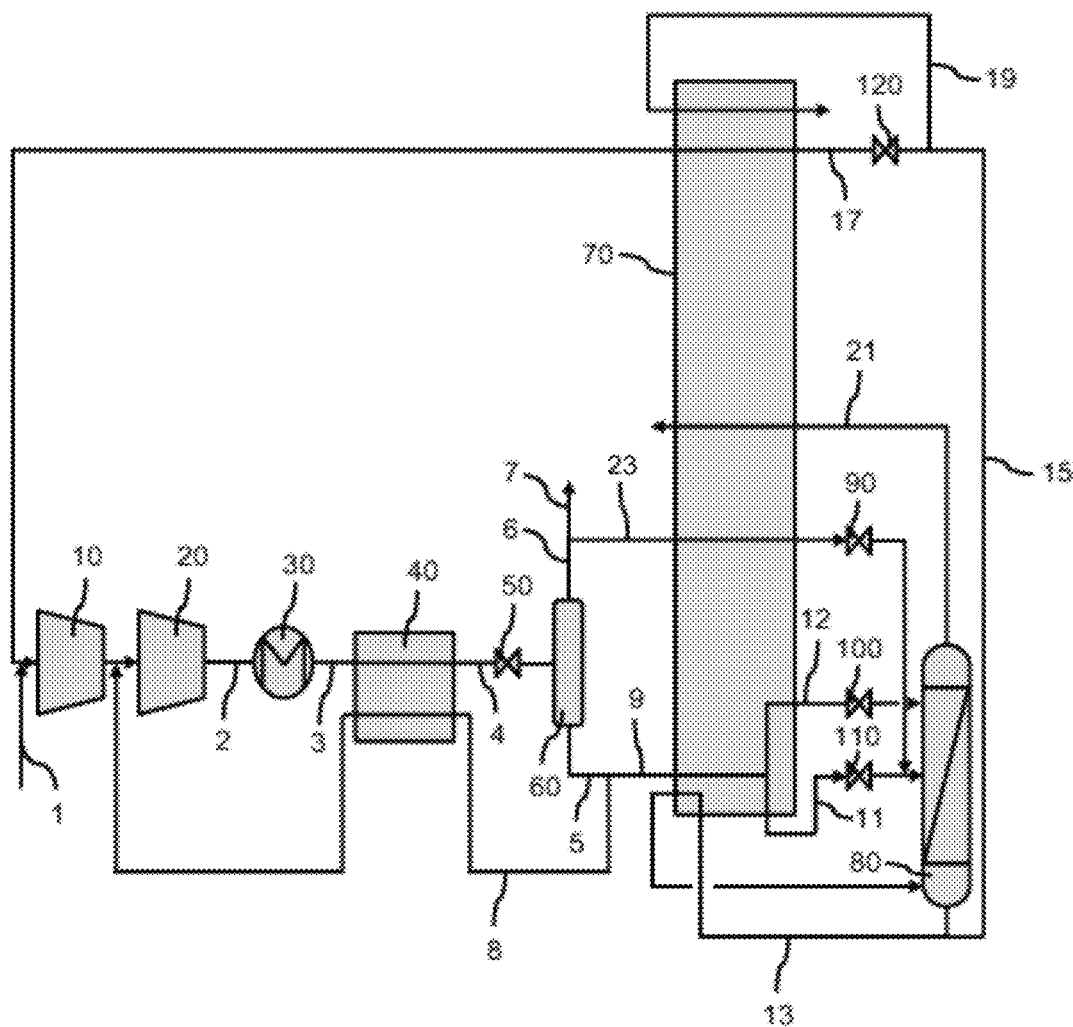

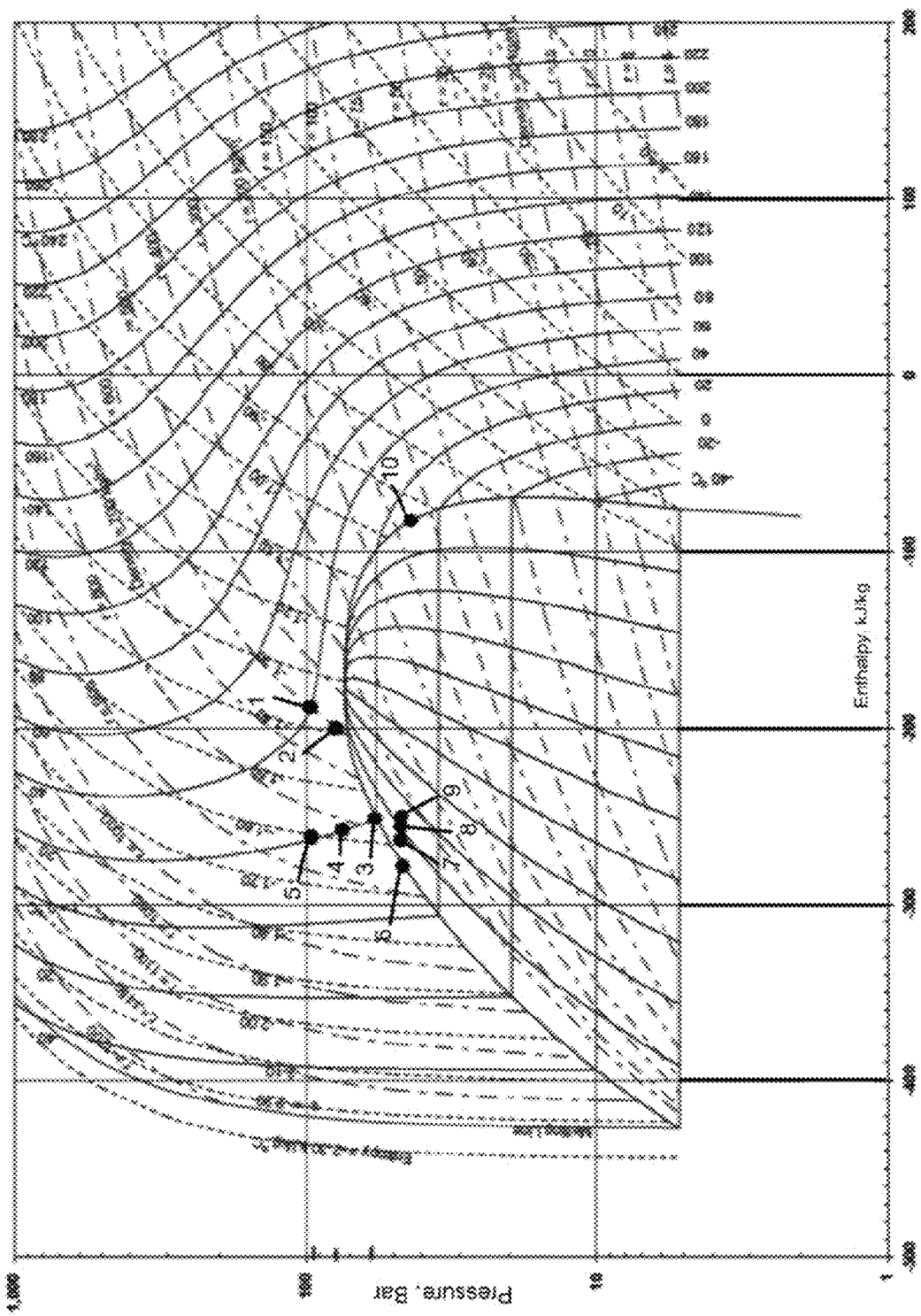
[Fig. 2]

METHOD FOR LIQUEFYING A STREAM RICH IN CO$_2$

CROSS REFERENCE TO RELATED APPLICATIONS

This application is a § 371 of International PCT Application PCT/EP2022/055319, filed Mar. 2, 2022, which claims the benefit of FR2102068, filed Mar. 3, 2021, both of which are herein incorporated by reference in their entireties.

FIELD OF THE INVENTION

The present invention relates to a process for the liquefaction of a stream rich in CO$_2$.

BACKGROUND OF THE INVENTION

The liquefaction of CO$_2$ with CO$_2$ as refrigerant is a studied and known technology (see FR 2 975 478 and FR 2 934 170). The process of FR 3 088 416 makes possible an adaptability depending on the composition (H$_2$ and/or N$_2$).
US2014/026611 describes a process according to the preamble of claim 1.

SUMMARY OF THE INVENTION

In a process for the liquefaction of feed CO$_2$ rich in CO$_2$ (>80 molar %, indeed even >95 molar %) composed for the remainder predominantly of light impurities (CO, N$_2$, O$_2$, for example), the CO$_2$ is compressed up to a supercritical pressure. The latter is directed to a main heat exchanger through a first heat exchanger which allows the CO$_2$ to be cooled as much as possible using a dedicated cooling fluid (air, water, for example), then a second heat exchanger, the role of which is to cool the CO$_2$ below the limit imposed by the dedicated cooling fluid, and finally an expansion valve at a pressure below the critical pressure allowing the CO$_2$ to be cooled in the second heat exchanger by a part of the liquid CO$_2$ obtained. This combination allows flexibility in the feed composition and the ambient conditions. Thus, the repercussion with regard to the efficiency of the scheme as well as with regard to the compressor and main exchanger is limited.

Certain embodiments of the present invention relate to a process for the liquefaction of a gas rich in CO$_2$ where the gas rich in CO$_2$ is itself employed as refrigerant in the refrigeration cycle, following its liquefaction. Its pressure is increased by virtue of a compressor, which will make it possible to expand it in order to lower the temperature thereof down to a level compatible with the liquefaction of the feed stream. However, before its expansion, the gas rich in CO$_2$ must be cooled, thus making possible a sufficient drop in temperature. During this operation, the density of the gas rich in CO$_2$ will increase significantly. The density of the gas rich in CO$_2$ is very sensitive to the pressure and temperature conditions when it is in the supercritical state. In the case of cooling of the gas rich in CO$_2$ compressed by means of ambient air or of cooling water itself cooled with ambient air, its density is subject to variations in the ambient temperature. This can generate operating instabilities during the liquefaction of the feed stream between day and night, winter and summer. The objective of the present invention is to limit the effects of the variation in temperature of the fluid used to cool the gas rich in CO$_2$, in particular that due to the variation in the ambient temperature.

According to a subject matter of the invention, there is provided a process for the liquefaction of a gas rich in carbon dioxide, in which:
i) the gas is compressed to a first pressure greater than its critical pressure, indeed even greater than 80 bara, in a compressor, to form a compressed gas,
ii) the compressed gas is cooled by heat exchange with a refrigerant having a variable temperature to form a cooled compressed fluid with a density between 370 and 900 kg/m$^3$, indeed even between 450 and 750 kg/m$^3$,
iii) the cooled compressed fluid is cooled at the supercritical pressure in a first heat exchanger down to a temperature below the critical temperature, for example between 5° C. and 25° C.,
iv) the gas cooled below the critical temperature is expanded to a second pressure between 45 and 60 bara to form a liquid or a two-phase fluid which is optionally separated in a phase separator to form a liquid and a gas,
v) a part of the liquid or of the two-phase fluid from step iv) or of the liquid originating from the phase separator supplies cold to the first heat exchanger, and
vi) a part of the liquid or of the two-phase fluid from step iv) or of the liquid originating from the phase separator is subcooled to form a subcooled liquid, characterized in that:
vii) if the temperature of the refrigerant of step ii) lessens, the first pressure is reduced and, if the temperature of the refrigerant of step ii) increases, the first pressure is increased, and/or
viii) if the temperature of the refrigerant of step ii) lessens, the flow of liquid (9) or of two-phase fluid sent to the first heat exchanger (80) is reduced and, if the temperature of the refrigerant, for example air or water, of step ii) increases, the flow of liquid or of two-phase fluid sent to the first heat exchanger is increased.

According to other optional aspects which can be combined together in any way compatible with science and logic:
the part of the liquid or of the two-phase fluid which provides cold in the first heat exchanger heats up in the first heat exchanger and preferably vaporizes therein,
the part of the liquid or of the two-phase fluid which supplies cold to the first heat exchanger is sent after vaporization to be mixed with the gas to be compressed,
the part of the liquid or of the two-phase fluid from step iv) or the part of the liquid originating from the phase separator is subcooled in a second heat exchanger and sent to be separated in a distillation column and a liquid enriched in carbon dioxide is withdrawn from the distillation column as product,
a part of the bottom liquid from the distillation column vaporizes in the second heat exchanger and is sent to the compressor in order to be compressed therein with the gas to be separated,
the compressor comprises at least two stages and the vaporized bottom liquid is sent to the compressor at a lower pressure than that at which the liquid vaporized in the first heat exchanger is sent thereto,
at least a part of the gas formed in the phase separator is discharged to the atmosphere and/or is cooled in the second heat exchanger before being sent to the distillation column and/or is sent to the compressor in order to be compressed therein with the gas to be separated, if the gas to be liquefied becomes less rich in carbon dioxide, the flow of gas formed in the phase separator discharged to the atmosphere is increased, if the carbon dioxide content of the gas to be liquefied falls below a threshold, the flow of gas formed in the phase separator discharged to the atmosphere is increased, the gas to be separated is compressed in the at least two stages of the compressor, the density of the liquid from step iv) or of the two-phase fluid is between 750 and 950 kg/m³, indeed even between 820 and 850 kg/m³, the cooled compressed gas is cooled at the supercritical pressure in the first heat exchanger down to a temperature between 15° C. and 25° C., the first pressure is regulated in order to have one of N pressures, N being an integer between 2 and 5, whatever the temperature of the refrigerant, during a first period, the refrigerant is at an average temperature of T° C. and, during a second period, the refrigerant is at an average temperature of T+20° C. and in which the density of the liquid from step iv) or of the liquid fraction of the two-phase fluid during the first period differs from that during the second period only by at most 100 kg/m³.

In a scheme for the liquefaction of a gas rich in $CO_2$ where the gas rich in $CO_2$ is itself employed as refrigerant of the refrigeration cycle, the present invention proposes to compress a feed stream of $CO_2$, concentrated in $CO_2$ (>95 molar %) and the remainder predominantly of lighter components called "noncondensables" ($CO$, $N_2$, $O_2$, for example), to a pressure beyond the critical pressure of $CO_2$ (73.3 bara). This makes it possible to obtain a gas rich in $CO_2$ which is as dense as possible after cooling if the cooling fluid used (air, water, for example) has a temperature too high to condense the gas rich in $CO_2$. This $CO_2$ is then injected into a main heat exchanger, called the second heat exchanger, which can be a brazed aluminum plate exchanger.

Thus, before it enters the heat exchanger, it is to start with cooled as much as possible by means of a dedicated cooling fluid (water, air, for example), making it possible to densify the high-pressure fluid to a value of approximately between 370 and 900 kg/m³. The outlet temperature of this heat exchanger is thus subject to variations in the ambient temperature via the cooling fluid.

The high-pressure and partially cooled main fluid is directed to a first heat exchanger which can be a shell-and-tube or plate heat exchanger, for example. The fluid rich in $CO_2$ emerges therefrom with a temperature of between 5° C. and 25° C.

The cooling of the $CO_2$ is provided by the $CO_2$ itself, which is expanded to a pressure between 45 bara and 60 bara. The gas generated by the expansion, if present, can be directed to the second heat exchanger (main exchanger) in order to be liquefied therein or recycled to the compressor. A part of the liquid resulting from the separator is recycled to the first heat exchanger acting as a cold stream to this exchanger. The other part is directed to the main exchanger to be subcooled therein. The expansion makes it possible for the fluid to pass from the supercritical state to the liquid state, the density of which is more stable and less sensitive to variations in temperature.

This configuration has three advantages:

When the ambient temperature varies, the impact on the liquefaction zone made up of the main exchanger is less since it is taken care of by the first heat exchanger.

When the ambient temperature is high, the compressor of the gas rich in $CO_2$ will provide the maximum discharge pressure in order to densify the stream as much as possible. When the ambient temperature decreases, the discharge pressure can be reduced and the first exchanger will also reduce its load (by minimizing the share of the $CO_2$ vaporized and recycled to the compressor) in order to obtain a constant density at the inlet of the main exchanger (70).

Likewise, when the composition of the feed is degraded and is enriched by noncondensables, the phase separator (if present) makes it possible to purge the surplus of light compounds in order to make it possible for the main exchanger to always operate under similar conditions in terms of fluid at the inlets.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments FIG. 1 illustrates a process according to the invention.

FIG. 2 is a Mollier chart showing several cooling steps according to the invention.

DETAILED DESCRIPTION OF THE INVENTION

A gas 1 containing at least 80 mol %, preferably at least 95 mol %, of carbon dioxide as well as impurities, such as carbon monoxide, nitrogen or oxygen, is compressed in the first part 10 of a compressor, comprising at least one stage. Subsequently, it is compressed in the second part 20 of the compressor, comprising at least one stage, to reach a pressure greater than the critical pressure. The supercritical fluid 2 is cooled in a cooler 30 by a refrigerant, the temperature of which is liable to change with the ambient temperature, for example air or water, to form a supercritical fluid 3 with a density between 370 and 900 kg/m³. The gas 3 is cooled in a heat exchanger 40 to reach a subcritical temperature, for example between 5° C. and 25° C. The fluid 4 formed is expanded in a valve 50 to a pressure between 45 and 60 bara to form a two-phase fluid which is subsequently separated in a phase separator 60.

A part 8 of the liquid from the phase separator 60 is used to cool the first heat exchanger 40. In this example, the liquid 8 vaporizes in the exchanger 40 and is returned to the gas to be separated 1 between the two parts 10, 20 of the compressor.

In addition, the transfer of cold to the heat exchanger can be carried out through another means; thus, the liquid 8 is not necessarily sent itself into the first exchanger 40.

It is also possible for the expansion in the valve 50 to be able to produce a single-phase liquid. In this case, the phase separator 60 is not necessary. A part of this liquid will thus be used to supply cold to the first exchanger 40.

Certain usages of the liquid expanded in the valve 50 or of types of exchangers for subcooling it tolerate the presence of a certain amount of gas in the liquid. In these cases also, the presence of the phase separator 60 is optional.

The liquid produced after the expansion in the valve 50 can constitute the product of the process, without subsequent purification in a column or the like. It is the same for the liquid 5 from the phase separator.

Alternatively, as illustrated in the figure, the liquid 5 (or the liquid expanded in the valve 50 if the separator 60 is not present) is divided into two parts. The part 8, which has already been mentioned, serves to cool the first exchanger and the part 9 is cooled in the heat exchanger 70, which is a brazed aluminum plate heat exchanger.

In this example, the liquid 9 is cooled down to an intermediate temperature, then divided into two to form two flows 11, 12. The first flow 11 leaves the exchanger 70 at an intermediate temperature, is expanded in a valve 110 and then sent to the distillation column 80 at an intermediate level thereof. The second flow 12 is cooled as far as the cold end of the exchanger 70, is expanded in a valve 100 and is sent to the top of the column 80. It is also possible to envisage other ways of feeding the column, for example by sending a single liquid flow to the column. The column can also be replaced by at least one phase separator.

The bottom liquid from the column 80 enriched in carbon dioxide is divided into three parts. A part 13 is heated in the exchanger 70 and sent to the bottom of the column 80 to contribute heat. A part 19 is subcooled in the exchanger 80 to form a liquid product of the process.

A part 17 is expanded in a valve 120 and vaporizes in the heat exchanger 70 to form a gas which is mixed with the gas 1 and is compressed in the compressor 10, 20.

The gas 7 from the phase separator 60, if present, can be sent to the air and/or cooled in the heat exchanger 70 as gas 10, expanded and sent to feed the column 80 and/or sent to the compressor 10, 20 to be compressed with the gas 1.

The cooler 30 is cooled by a refrigerant having a variable temperature, for example air or water. According to the temperature of the refrigerant, the density of the gas 3 cooled in the cooler can vary between 370 and 900 kg/m$^3$. Due to the use of the first heat exchanger, the density of the liquid obtained after the valve 50 remains between 750 and 950 kg/m$^3$, indeed even between 820 and 850 kg/m$^3$, whatever the temperature of the refrigerant. Thus, the variation in density is greatly alleviated for the liquid produced.

If the temperature of the refrigerant increases (for example if the ambient temperature increases in the case of water and air), the compressor 10, 20 produces a flow 2 at a higher pressure in order to achieve the desired density.

If the temperature of the refrigerant lessens (for example if the ambient temperature lessens in the case of water and air), the compressor 10, 20 produces a flow 2 at a lower pressure in order to achieve the same desired density. In this case, the amount of cold sent to the first heat exchanger 40 will be reduced, for example by reducing the flow of gas 8 sent to the heat exchanger 40 in order to cool it. This makes it possible to obtain an unvarying density downstream of the valve 50.

Preferably, the heat exchanger 40 makes possible the direct exchange of heat between the flow 3 and the flow 8 only.

If the composition of the flow 1 varies and becomes less rich in carbon dioxide, the phase separator 60 sends more gas 7 to the atmosphere in order for the liquid product 5 from the phase separator 60 to have a virtually unvarying composition. This makes it possible for the heat exchanger 70 (if present) to cool a liquid having a stabilized composition.

The Mollier table of [FIG. 2] makes it possible to illustrate the cooling of a flow of pure $CO_2$. If the refrigerant, for example cooling water, is at 35° C., the $CO_2$ is at 40° C. (counting 5° C. of approach) and if a density of 600 kg/m 3 is regarded as sufficient at the inlet of the exchanger 40, there must be a pressure of more than 90 bara (point 1). On the other hand, if the water is colder, 30° C. for example, the $CO_2$ is at 35° C. and, with the same density, only 80 bara is needed (point 2). Finally, if the water is at 15° C., the $CO_2$ at 20° C., it will be liquefied in the vicinity of 60 bara (point 3).

In operation, the compressor 10, 20 will be regulated with an outlet pressure value which is a function of the temperature of the $CO_2$ obtained after cooling by the refrigerant. In order to avoid excessively large and excessively frequent fluctuations (for example between day and night), pressure set points can be defined in advance for several weeks/months. With the example above, it might be possible to imagine operating in summer at more than 90 bara, in winter at approximately 60 bara and the rest of the time at 80 bara. The inlet guide vanes of the compressor 10, 20 will be adjusted in order to modify the outlet pressure.

If the process is continued, cooling will be carried out down to a temperature of 20° C. according to the preceding example (points 4 and 5), then expanding will be carried out to a pressure lower than the critical pressure, 50 bara in the example (points 7, 8, 9). The formation is then observed of a liquid/vapor mixture and thus, whatever the starting point (among the points 1, 2, 3), points which are very close and at the same density are obtained. The liquid can thus go into the cryogenic part with the same conditions, whatever the temperature of the refrigerant (point 6). The only difference is the gas/liquid fraction obtained but the points 7, 8, 9 are very close, the fraction then being not greatly impacted.

The example of the Mollier table above is for pure $CO_2$. With light impurities, it would be necessary to rise higher in pressure in order to reach the same density. After cooling and expansion, the vapor fraction generated (point 10 in the case of pure $CO_2$) is concentrated in light impurities. Furthermore, the more light impurities there are, the more the vapor fraction increases and thus its flow. As the vapor flow is increasing, the pressure within the pot 60 will increase. It will be possible to decide to open a valve toward venting 7 when the value reached will be excessively high.

Downstream of the valve, the density at 45 bara is 870 kg/m 3 and 765 kg/m$^3$ at 60 bara if pure $CO_2$ was concerned. With a small amount of light products, this density will vary downward.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for the liquefaction of a gas rich in carbon dioxide, the process comprising the steps of:
   i. compressing the gas to a first pressure greater than its critical pressure in a compressor to form a compressed gas;
   ii. cooling the compressed gas by heat exchange with a refrigerant having a variable temperature to form a cooled compressed gas with a density between 370 and 900 kg/m$^3$;
   iii. cooling the cooled compressed gas at the supercritical pressure in a first heat exchanger down to a temperature below the critical temperature;
   iv. expanding the gas cooled below the critical temperature to a second pressure between 45 and 60 bara to form a liquid or a two-phase fluid;
   wherein a part of the liquid or of the two-phase fluid from step iv) supplies cold to the first heat exchanger; and
   where in the part of the liquid or of the two-phase fluid from step iv) is subcooled to form a subcooled liquid:
   wherein, if the temperature of the refrigerant of step ii) lessens, the first pressure is reduced and/or,
   if the temperature of the refrigerant of step ii) increases, the first pressure is increased, and/or
   if the temperature of the refrigerant of step ii) lessens, the flow of liquid or of two-phase fluid sent to the first heat exchanger is reduced and/or,
   if the temperature of the refrigerant of step ii) increases, the flow of liquid or of two-phase fluid sent to the first heat exchanger is increased,
   wherein the first pressure is regulated in order to have one of N pressures, N being an integer between 2 and 5, whatever the temperature of the refrigerant.

2. The process as claimed in claim 1, wherein the part of the liquid or of the two-phase fluid which provides cold in the first heat exchanger heats up in the first heat exchanger.

3. The process as claimed in claim 1, wherein the part of the liquid or of the two-phase fluid which supplies cold to the first heat exchanger is vaporized in the first heat exchanger and then mixed with the gas to be compressed.

4. The process as claimed in claim 1, wherein the part of the liquid or of the two-phase fluid from step iv) is subcooled in a second heat exchanger and sent to be separated in a distillation column and a liquid enriched in carbon dioxide is withdrawn from the distillation column as product.

5. The process as claimed in claim 4, wherein a part of the bottom liquid from the distillation column vaporizes in the second heat exchanger and is sent to the compressor in order to be compressed therein with the gas to be separated.

6. The process as claimed in claim 5, wherein the part of the liquid or of the two-phase fluid which supplies cold to the first heat exchanger is vaporized in the first heat exchanger, wherein the compressor comprises at least two stages and the vaporized bottom liquid is sent to the compressor at a lower pressure than that at which the liquid vaporized in the first heat exchanger is sent thereto.

7. The process as claimed in claim 1, wherein the two-phase fluid from step iv) is separated in a phase separator to form a liquid and a gas wherein at least a part of the gas formed in the phase separator is discharged to the atmosphere.

8. The process as claimed in claim 7, wherein, if the gas to be liquefied becomes less rich in carbon dioxide, the flow of gas formed in the phase separator discharged to the atmosphere is increased.

9. The process as claimed in claim 1, wherein the two-phase fluid from step iv) is separated in a phase separator to form a liquid and a gas, wherein at least a part of the gas formed in the phase separator is cooled in a second heat exchanger before being sent to a distillation column.

10. The process as claimed in claim 1, wherein the two-phase fluid from step iv) is separated in a phase separator to form a liquid and a gas, wherein at least a part of the gas formed in the phase separator is sent to the compressor in order to be compressed therein with the gas to be separated.

11. The process as claimed in claim 1, wherein the two-phase fluid from step iv) is separated in a phase separator to form a liquid and a gas, wherein the gas from the phase separator is compressed in the at least two stages of the compressor.

12. The process as claimed in claim 1, wherein h the density of the liquid from step iv) or of the two-phase fluid is between 750 and 950 kg/m$^3$.

13. A process for the liquefaction of a gas rich in carbon dioxide, the process comprising the steps of:
   i. compressing the gas to a first pressure greater than its critical pressure in a compressor to form a compressed gas;
   ii. cooling the compressed gas by heat exchange with a refrigerant having a variable temperature to form a cooled compressed gas with a density between 370 and 900 kg/m$^3$;
   iii. cooling the cooled compressed gas at the supercritical pressure in a first heat exchanger down to a temperature below the critical temperature;
   iv. expanding the gas cooled below the critical temperature to a second pressure between 45 and 60 bara to form a liquid or a two-phase fluid;
   wherein a part of the liquid or of the two-phase fluid from step iv) supplies cold to the first heat exchanger; and
   wherein a part of the liquid or of the two-phase fluid from step iv) is subcooled to form a subcooled liquid:
   wherein, if the temperature of the refrigerant of step ii) lessens, the first pressure is reduced and/or,
   if the temperature of the refrigerant of step ii) increases, the first pressure is increased, and/or
   if the temperature of the refrigerant of step ii) lessens, the flow of liquid or of two-phase fluid sent to the first heat exchanger is reduced and/or,
   if the temperature of the of refrigerant of step ii) increases, the flow of liquid or of two-phase fluid sent to the first heat exchanger is increased,
   wherein, during a first period, the refrigerant is at an average temperature of T° C. and, during a second period, the refrigerant is at an average temperature of T+20° C., such that the density of the liquid from step iv) or of the liquid fraction of the two-phase fluid during the first period differs from that during the second period only by at most 100 kg/m³.

* * * * *